No. 739,527. PATENTED SEPT. 22, 1903.
C. F. WHITNIGHT.
PIN RETAINER.
APPLICATION FILED MAY 21, 1903.
NO MODEL.

WITNESSES:
O. L. Hough
Euphrasia Henry

INVENTOR
Charles F. Whitnight
BY
Harry Frease
ATTORNEY

No. 739,527. Patented September 22, 1903.

UNITED STATES PATENT OFFICE.

CHARLES F. WHITNIGHT, OF CANTON, OHIO, ASSIGNOR OF TWO-THIRDS TO LEON E. BILL AND WILLIAM R. SIMPSON, OF CANTON, OHIO.

PIN-RETAINER.

SPECIFICATION forming part of Letters Patent No. 739,527, dated September 22, 1903.

Application filed May 21, 1903. Serial No. 158,062. (No model.)

*To all whom it may concern:*

Be it known that I, CHARLES F. WHITNIGHT, a citizen of the United States, residing at Canton, in the county of Stark and State of Ohio, have invented a new and useful Pin-Retainer, of which the following is a specification.

The invention relates to a device to be applied over the end of a stickpin, hat-pin, or any other pin-shank after the same has been inserted through a necktie, a hat, or other object to prevent the pin from being withdrawn from the same; and the objects of the invention are to provide a simple device which can be easily and conveniently applied and removed and which will be effective for the purpose intended. I attain these objects by the retainer illustrated in the accompanying drawings, in which—

Figure 1:
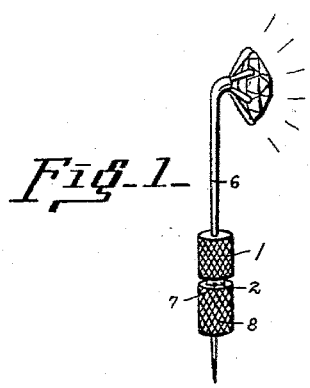
Figure 2:
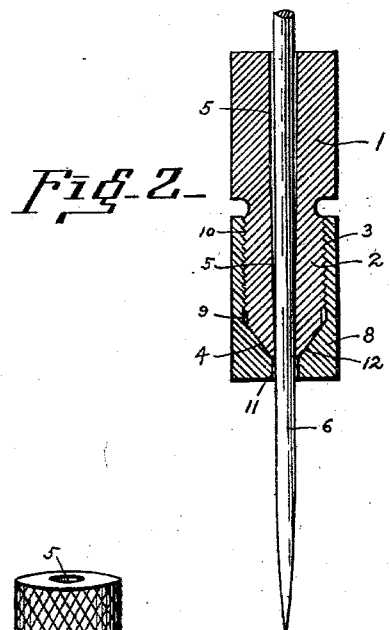
Figure 3:
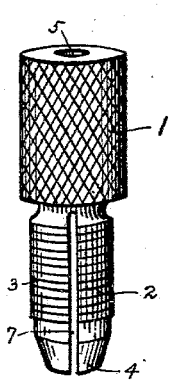
Figure 4:
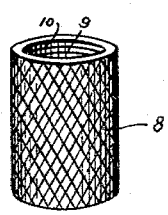

Figure 1 is a perspective view of a stickpin with the retainer applied thereon; Fig. 2, a longitudinal section of the end of the pin with the retainer applied thereon; Fig. 3, a perspective view of the body of the retainer; Fig. 4, a perspective view of the cap of the retainer.

Similar numerals refer to similar parts throughout the drawings.

The body 1 of the retainer is preferably cylindrical in form, although it may be made polygonal in section, and when cylindrical it preferably has its sides grooved or roughed to give better adhesion for the fingers. On one end of the body is formed the shank 2, which is preferably formed of less diameter than the body and is provided with the external thread 3. The free end of the shank is tapered to form the cone-shaped apex 4. Through the body and shank is provided the axial aperture 5, which is formed slightly larger than the diameter of the pin 6, so that the pin can be readily inserted in the axial aperture, and in the shank is provided the longitudinal slit 7, which extends from its free end to or near to the body, thus giving the sides of the shank some lateral elasticity.

The cap 8 of the retainer is also preferably cylindrical in form and of like diameter and finish as the body. In one end of the cap is formed the socket 9, which is adapted to receive the body-shank and is provided with the internal thread 10, adapted to mesh with the shank-thread. In the head of the cap is provided the axial aperture 11, which is formed large enough to freely pass the pin. The bottom of the socket is tapered to form the cone-shaped recess 12, which is adapted to receive the similar apex of the shank and to laterally compress the shank on the pin when the cap is screwed onto the shank, as shown in Fig. 2.

The cap is normally screwed but part way on the shank, so that the axial apertures freely receive the pin. After the stickpin is inserted through a necktie the free end of the pin is inserted in the axial apertures of the retainer, whereupon a slight turning or screwing of the cap on the shank to bring the conic recess of the cap against the similar apex of the shank tightly compresses the sides of the shank against the sides of the pin by reason of the slit in the shank, which compression acts to hold the retainer tightly on the pin and prevents the pin from being withdrawn from the necktie by accident or theft. To remove the pin, it is only necessary to slightly unscrew the cap on the shank, which releases the grip of the shank on the pin and enables it to be freely withdrawn.

What I claim as my invention, and desire to secure by Letters Patent, is—

1. In combination, a pin, a retainer thereon comprising a body having an externally-threaded slit shank with a tapered end, and a cap having a threaded socket with a tapered bottom, screwed on the shank, there being through axial apertures in the body, shank and cap receiving the pin.

2. A pin-retainer comprising a body having an externally-threaded split shank with a tapered end, and a cap having a threaded socket with a tapered bottom, screwed on the shank, there being through axial apertures in the body, shank and cap.

In testimony whereof I have hereunto signed my name to this specification in the presence of two subscribing witnesses.

CHARLES F. WHITNIGHT.

In presence of—
HARRY FREASE,
NORMA KISTER.